US012773870B2

(12) United States Patent
Croner

(10) Patent No.: US 12,773,870 B2
(45) Date of Patent: Oct. 27, 2026

(54) DEVICE AND METHOD FOR CREATING ARTISTIC DESIGNS

(71) Applicant: Lisa J. Croner, San Diego, CA (US)

(72) Inventor: Lisa J. Croner, San Diego, CA (US)

( * ) Notice: Subject to any disclaimer, the term of this patent is extended or adjusted under 35 U.S.C. 154(b) by 0 days.

(21) Appl. No.: 19/631,812

(22) Filed: Mar. 27, 2026

(65) Prior Publication Data

US 2026/0296095 A1 Oct. 1, 2026

Related U.S. Application Data

(60) Provisional application No. 63/814,209, filed on May 29, 2025, provisional application No. 63/780,113, filed on Mar. 28, 2025.

(51) Int. Cl.
*B44D 2/00* (2006.01)

(52) U.S. Cl.
CPC .................................... *B44D 2/00* (2013.01)

(58) Field of Classification Search
CPC ...................................................... B44D 2/00
See application file for complete search history.

(56) References Cited

U.S. PATENT DOCUMENTS 12,643,340 B2 * 6/2026 Kraus ...................... B44D 3/22

* cited by examiner

*Primary Examiner* — Yingchuan Zhang
(74) *Attorney, Agent, or Firm* — Jafari Law Group, Inc.

(57) ABSTRACT

A device and method for creating artistic designs through controlled fluid dynamic interactions is disclosed. In exemplary embodiments, the device comprises a first transparent or translucent plate member and at least a second plate member, with an interior region to retain fluid media, marking substances, and/or a fluid-particle mixture within an interior region between the plates when in a closed configuration. The method involves positioning the plates in an open configuration, introducing fluid media and marking substances onto interior surfaces, closing the plates to contain the materials, imparting controlled movements to induce fluid dynamic interactions, observing pattern formation through the transparent portion, and selectively continuing movement to develop artistic patterns. The device facilitates creation of unique visual designs exhibiting both naturalistic and abstract characteristics through physical principles of fluid dynamics, surface tension, and capillary action within a controlled environment.

20 Claims, 7 Drawing Sheets

FIG. 1A
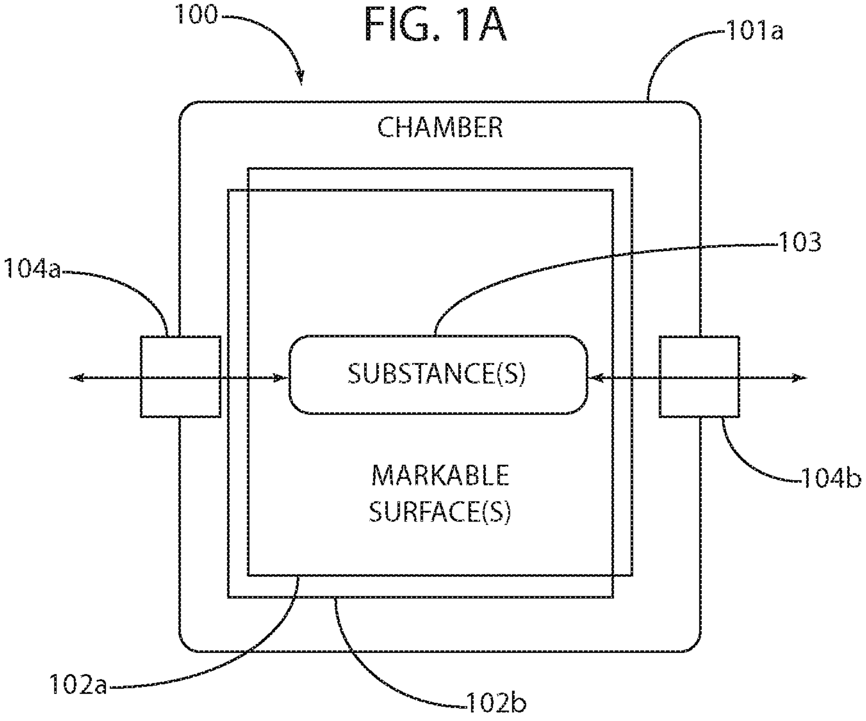
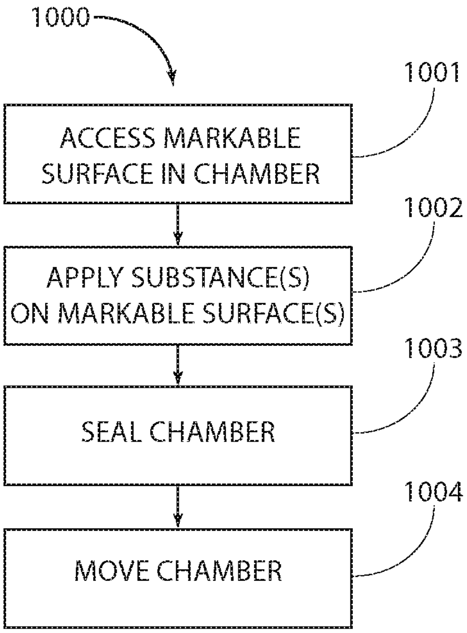
FIG. 1B
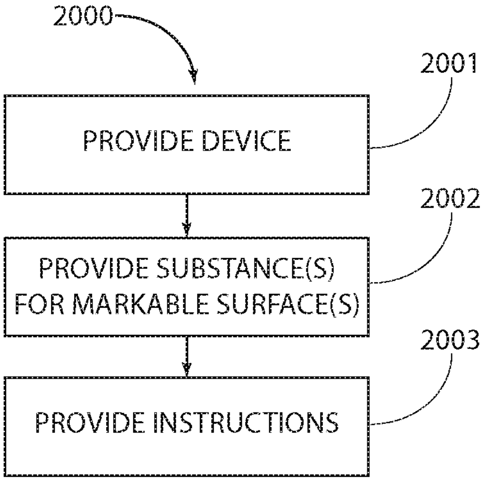
FIG. 1C

300

Step 1. With device open at hinge, place small puddles of solvent (e.g. water) and drawing material (e.g. charcoal powder mixed in water) on exposed surface of bottom plate.

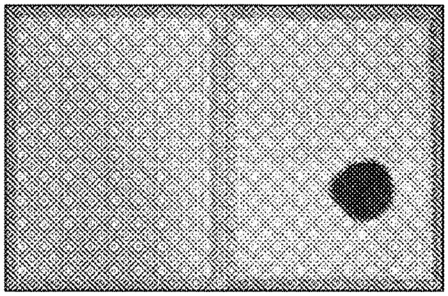

Step 2. Close the device across the hinge. The top plate will rest on the gasket/frame material and lightly press on the puddles.

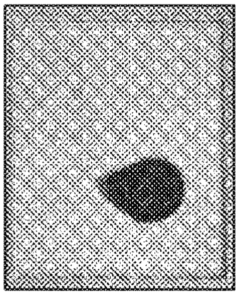

Step 3. Holding the device horizontally in your hands, gently tilt it back and forth in any direction so that the fluid moves in the area between the plates.

Step 4. Observe the design created on the plates.

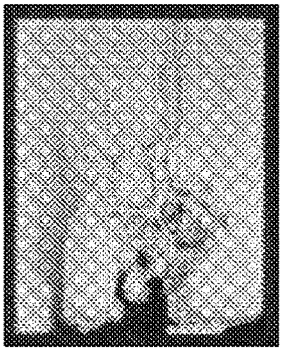

Step 5. Continue tilting the device to move the fluid and change the design as desired. You can also open the device to change the design and/or add new/different drawing materials.

FIG. 3

DEVICE AND METHOD FOR CREATING ARTISTIC DESIGNS

PRIORITY

This application is a Non-provisional Application claiming the benefit of U.S. Provisional Application No. 63/780,113, filed on Mar. 28, 2025, and also claims the benefit of U.S. Provisional Application No. 63/814,209, filed on May 29, 2025, the disclosure of which is incorporated by reference in their entirety.

TECHNICAL FIELD

The present invention relates to the field of artistic design creation tools, specifically to devices and methods for generating visual artistic patterns through controlled fluid dynamic interactions between contained mark-making substances. The present invention particularly pertains to apparatuses that facilitate the creation of visual compositions through user-controlled manipulation of contained marking media.

BACKGROUND

The creation of visual designs and artistic works has long been a pursuit across diverse media and methodologies. Within this broad field, various devices and techniques have been developed to generate visual patterns and forms. Certain established approaches involve the observation of dynamic processes occurring in fluid media. For instance, devices have been created to showcase the movement of liquids, sometimes incorporating particulate matter to enhance visual complexity. These devices often serve primarily as displays of naturally occurring fluid dynamics, with limited capacity for direct user manipulation of the visual outcome beyond initial setup.

Another category of existing art-related devices includes those designed to produce static visual representations reminiscent of natural landscapes or geological formations. These may, in some instances, be inspired from the observation of dynamic fluid processes, but ultimately aim to create a fixed visual artifact. The methods employed can range from controlled chemical reactions to the manipulation of viscous materials to simulate natural textures and patterns. Relevant examples include kinetic sandscape devices where sand flows through liquids creating temporary patterns, moving sand-art displays where colored sands form shifting landscapes, and rotational art devices which use centrifugal force to distribute paint in radial patterns. However, some these approaches typically result in a singular, relatively permanent design, with limited scope for iterative modification or dynamic evolution by the user.

Furthermore, the field of mechanized drawing and design generation is also well-established. Automated devices, often employing electromechanical actuators under programmed or direct user control, have been developed to create precise graphical patterns and illustrations. These devices are configured for generating certain types of repeatable geometric forms. The designs produced by such mechanized systems are often characterized by a degree of regularity and predictability, potentially lacking the nuanced irregularities and organic qualities found in naturally occurring forms or in art created through more fluid and less rigidly controlled processes. Moreover, the user interaction with such devices is frequently constrained to the input of operational parameters or the selection from a predefined set of movements, which may limit the immediacy and intuitive nature of artistic exploration.

Therefore, there is need for artistic methodologies and apparatus that facilitate a more versatile and engaging creative process, thereby allowing users to explore a wider range of visual outcomes through intuitive and interactive manipulation, and to readily modify and evolve designs in response to ongoing observation and creative intent.

SUMMARY OF THE INVENTION

One aspect of the present invention involves a device for creating an artistic drawing. The device comprises a first plate and a second plate arranged to define an interior region between opposing interior surfaces of the first and second plates; a gasket assembly including a gasket disposed along a perimeter of the interior region adapted to establish a spacing that concentrates a surface tension at the edges of a fluid-particle mixture and to facilitate the retention of the fluid-particle mixture within the interior region when the device is in a closed configuration, the fluid-particle mixture comprised of fluid media and marking substances; and a transparent or translucent viewing portion through which pattern formation within the interior region is observable when the device is in the closed configuration. In the closed configuration, user-controlled movement of the device causes fluid dynamic interactions between the fluid media and the marking substances such that a fluid-particle mixture flows between the opposing interior surfaces and leaves deposited marking particles on at least one opposing interior surface to form the artistic drawing observable through the viewing portion.

In one alternative embodiment, the gasket assembly further includes a frame disposed along the perimeter of the interior region, the frame configured to substantially retain the fluid media and the marking substances within the interior region when the device is in the closed configuration.

In one alternative embodiment, the gasket and the frame are positioned around the perimeter of the interior region to form a fluid-tight seal when the device is in the closed configuration.

In one alternative embodiment, the spacing enables at least a portion of the fluid-particle mixture to contact both the opposing interior surfaces during flow.

In one alternative embodiment, the spacing is about 0.25 mm to about 3 mm.

In one alternative embodiment, the spacing and materials for the fluid media and the marking substances are selected such that meniscus boundaries of moving channels or globules of the fluid-particle mixture promote concentration of the marking particles near edges of the moving channels or globules and deposition of the marking particles along the edges.

In one alternative embodiment, the spacing is adapted to facilitate capillary bridging of the fluid media.

In one alternative embodiment, the device further comprises a hinge mechanism coupling the first plate to the second plate and permitting movement between an open configuration providing access to the interior region and the closed configuration.

In one alternative embodiment, the device is configured to permit transitioning from the closed configuration back to the open configuration to enable at least one of: adding new materials, removing materials, modifying deposited markets, or cleaning at least one interior surface, and subsequently returning to the closed configuration for continued development of the artistic drawing.

In one alternative embodiment, the device further comprises at least one access opening provided with a closure, the at least one access opening enabling introduction and/or removal of at least one of the fluid media or the marking substances to facilitate maintenance, cleaning, or reconfiguration of materials.

In one alternative embodiment, the marking substances comprise at least one of charcoal powder, graphite powder, pigments, metallic powders, or mica powders.

In another aspect of the present invention, the device comprises a first plate and a second plate arranged to define an interior region between opposing interior surfaces of the first and second plates; a hinge mechanism coupling the first plate to the second plate and permitting movement between an open configuration providing access to the interior region and a closed configuration; a gasket and frame assembly disposed along a perimeter of the interior region and configured to substantially retain fluid media and marking substances within the interior region when the device is in the closed configuration; and a transparent or translucent viewing portion through which pattern formation within the interior region is observable when the device is in the closed configuration. In the closed configuration, user-controlled movement of the device causes fluid dynamic interactions between the fluid media and the marking substances such that a fluid-particle mixture flows between the opposing interior surfaces and leaves deposited marking particles on at least one opposing interior surface to form the artistic drawing observable through the viewing portion.

In one alternative embodiment, each of the first plate and the second plate is transparent or translucent.

In one alternative embodiment, the gasket and frame assembly comprises a gasket positioned around the perimeter of the interior region to form a fluid-tight seal in the closed configuration.

In one alternative embodiment, in the closed configuration, the opposing interior surfaces are separated by a spacing selected to enable at least a portion of the fluid-particle mixture to contact both opposing interior surfaces during flow.

In one alternative embodiment, the spacing is about 0.25 mm to about 3 mm.

In one alternative embodiment, the spacing and materials are selected such that meniscus boundaries of moving channels or globules of the fluid-particle mixture promote concentration of marking particles near edges of the moving channels or globules and deposition of marking particles along the edges.

In one alternative embodiment, the artistic drawing accumulates over multiple user-controlled movements including repeated tilting and/or rotation to add deposited marking particles along multiple flow paths.

In one alternative embodiment, the device is configured to permit transitioning from the closed configuration back to the open configuration to enable at least one of: adding new materials, removing materials, modifying deposited marks, or cleaning at least one interior surface, and subsequently returning to the closed configuration for continued development of the artistic drawing.

In one alternative embodiment, the device further comprises at least one access opening provided with a closure, the access opening enabling introduction and/or removal of at least one of the fluid media or the marking substances to facilitate maintenance, cleaning, or reconfiguration of materials.

In one alternative embodiment, at least one opposing interior surface has surface properties selected from hydrophobic or hydrophilic characteristics to influence spreading or beading behavior of at least one component of the fluid media on the at least one opposing interior surface.

In one alternative embodiment, the marking substances comprise at least one of charcoal powder, graphite powder, pigments, metallic powders, or mica powders.

In one alternative embodiment, the artistic drawing is photographable through the transparent or translucent viewing portion while the device remains closed.

In one alternative embodiment, the artistic drawing exhibits intricate micro-structures suitable for high-resolution digital capture and enlargement to reveal fine details not readily visible at normal viewing distance.

Another aspect of the present invention involves a method for creating an artistic drawing using a device comprising a first plate and a second plate coupled by a hinge mechanism and defining an interior region therebetween. The method comprises positioning the device in an open configuration to expose the interior region; introducing fluid media and marking substances onto an interior surface within the interior region; transitioning the device to a closed configuration in which the fluid media and the marking substances are at least partially retained within the interior region by a gasket assembly, the gasket assembly configured to establish a spacing; imparting controlled movement to the device in the closed configuration to cause a fluid-particle mixture formed by the fluid media and the marking substances to flow between opposing interior surfaces; and forming deposited marking particles on at least one interior surface as edge traces of moving channels or globules of the fluid-particle mixture, thereby producing the artistic drawing observable through a transparent or translucent viewing portion in the closed configuration.

In one alternative embodiment, the controlled movement comprises at least one of tilting from side to side, circular rotations, quick jerking motions, or slow and gradual inclinations.

In one alternative embodiment, transitioning to the closed configuration establishes the spacing, the spacing selected such that at least a portion of the fluid-particle mixture contacts both the opposing interior surfaces during flow.

In one alternative embodiment, the deposited marking particles form preferentially along meniscus boundaries of the moving channels or globules.

In one alternative embodiment, the method further comprises reopening the device after imparting controlled movement to modify at least one of the fluid media, the marking substances, or deposits, and reclosing the device and repeating the imparting of controlled movement to further develop the artistic drawing.

In one alternative embodiment, the method further comprises allowing the deposited marking particles to dry on the at least one interior surface to retain the artistic drawing.

In one alternative embodiment, the method further comprises opening the device after completion and cleaning at least one interior surface to remove deposited materials and reuse the device for a subsequent artistic drawing.

In one alternative embodiment, introducing comprising applying a powder-fluid suspension or a fluid-particle mixture on the interior surface in the open configuration before transitioning to the closed configuration.

In one alternative embodiment, introducing comprises applying a powder marking substance onto the interior surface before applying a carrier fluid, and manipulating the powder marking substance and carrier fluid in the open configuration before transitioning to the closed configuration.

In one alternative embodiment, the fluid media comprises at least one of water, alcohol, mineral spirits, oil, or an art medium.

In one alternative embodiment, the method further comprises capturing a high-resolution digital image of the artistic drawing through the transparent or translucent viewing portion while the device remains closed, and digitally enlarging the image to reveal micro-structures and fine details suitable for creating large-format prints or derivative artistic outputs.

BRIEF DESCRIPTION OF THE DRAWINGS

FIG. 1A illustrates a block diagram of a device according to exemplary embodiments of the present invention.

FIG. 1B illustrates a flow chart of a method according to exemplary practice of some embodiments of the present invention.

FIG. 1C illustrates a flow chart of a method according to exemplary practice of some embodiments of the present invention.

FIG. 3 illustrates the steps of a method for design creation, showing the device in various configurations, according to an embodiment of the present invention.

DETAILED DESCRIPTION OF EXAMPLE EMBODIMENTS

Figure 1:
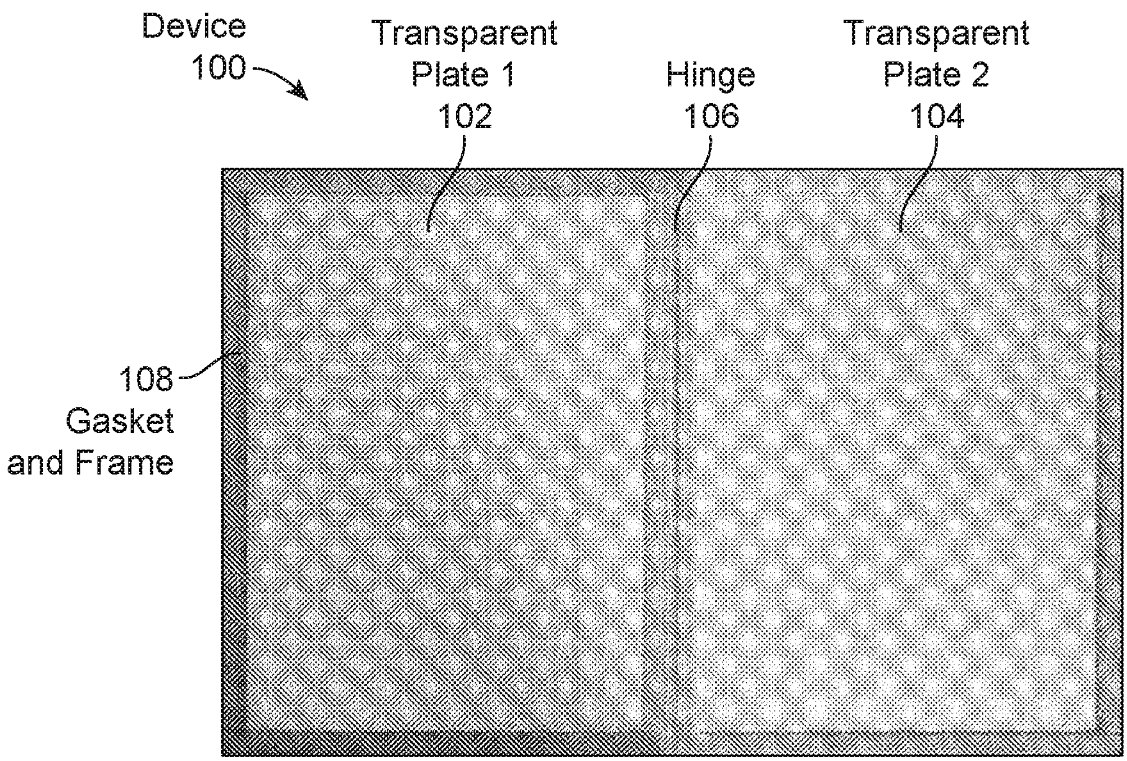
FIG. 1 illustrates a perspective view of a device for the dynamic creation of designs, depicting transparent plates, a hinge mechanism, and a gasket and frame component, according to an embodiment of the present invention.

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like elements but not necessarily the same or identical elements throughout.

Definitions

As used in the present disclosure, the term "mark-making substances" may include any substance that may be suitable for making marks (i.e., forming markings or designs on surfaces). Mark-making substances may thus include "fluids" such as traditional liquids (for example, and without limiting the scope or the invention, water, oils, or solvents) and flowable particulate materials (such as charcoal powder, graphite powder, or other granular substances) that move and redistribute when the device is manipulated. These mark-making substances work together within the system of the device to create the artistic patterns described herein.

As used herein, the term "drawing" refers to a visually perceptible composition formed by deposited marking particles on one or both interior surfaces of the plate members, wherein the deposits form stationary lines, curves, boundaries, or textures that remain after a fluid-particle mixture has flowed within the interior region. A drawing may be naturalistic, abstract, or both, and may develop progressively through multiple flow passes of the fluid-particle mixture. In some implementations, drawings are suitable for photographic capture (including high-resolution capture and enlargement) while the device remains closed.

As used in the present disclosure, the terms "fluid dynamics" and "fluid dynamic interactions" refer to the physical behavior and movement patterns of the aforementioned fluids and materials as they respond to all forces including gravity, surface tension effects, viscosity characteristics, and externally applied forces during device manipulation. These terms include the range of physical phenomena governing the movement and interaction of materials within the interior region.

As used in the present disclosure, the term "controlled" as applied to movements or fluid dynamics refers to user-directed actions that determine the artistic outcome. This control includes the user's ability to determine the direction, speed, duration, and intensity of movements applied to the device based on visual feedback of the developing design, enabling artistic expression through direct physical manipulation.

As used in the present disclosure, the terms "substantially contained" and "substantially retain" indicate that the containment structure effectively maintains the fluid media within the interior region during normal operation of the device. The containment structure provides the proper environment for the fluid dynamic interactions to occur as intended.

As used in the present disclosure, the terms "design" and "pattern" refer to the visual arrangements created through the described processes. The term "pattern" may refer to specific visual elements or arrangements within the broader "design," which encompasses the total visual composition created within the device.

Now turning to the figures, FIG. 1A illustrates a block diagram of a device according to exemplary embodiments of the present invention. More specifically, FIG. 1A depicts device 100, which is a device for creating artistic designs. In exemplary embodiments, and as illustrated in FIG. 1A, the device generally includes: an chamber 101*a* adapted to hold one or more substances 103; at least one markable surface (102*a* and/or 102*b*) housed inside the chamber 101*a*, wherein at least one or more markable surfaces 102*a* and 102*b* are adapted to receive the one or more substances 103; and at least one opening (104*a* and/or 104*b*) adapted to facilitate application of the one or more substances 103 onto the markable surface 102*a* or 102*b* inside the chamber 101*a*.

In some exemplary embodiments, the chamber 101*a* may include a gasket assembly, wherein the gasket assembly includes a gasket disposed along a perimeter of an interior region defined by the space between the opposing surfaces and is adapted to establish a spacing. In some exemplary embodiments, the gasket assembly is adapted to facilitate the retention of the one or more substances 103 within the interior region. In some exemplary embodiments, the gasket assembly may further include a frame disposed along the perimeter of the interior region, wherein the frame is configured to substantially retain the substances 103 within the interior region.

In some exemplary embodiments, the chamber 101*a* may comprise a body that forms a cavity within and in which a reservoir or repository may be formed in order to sealably hold one or more substances 103 in accordance with the present invention. Chamber 101*a* may be of any size or shape without deviating from the scope of the present invention, however, in exemplary embodiments, chamber 101*a* is easy to hold and manipulate and thus it has a size and shape that facilitates changing the orientation of chamber 101*a* with relative ease. Chamber 101*a* is also adapted to securely hold one or more markable surfaces 102*a* and or 102*b*, as explained further below.

One or more markable surfaces (e.g. here two are shown) 102*a* and 102*b* may be any surface that is suitable for creating artistic designs in accordance with the present invention. For example, and without deviating from the scope of the present invention, a markable surface may be any surface that readily allows substances-such as substances 103—to flow across the markable surface in a manner that allows the substance to move across and leave marks (i.e., residues of the substance) onto the markable surface so as to form a design onto the markable surface. In exemplary embodiments, a markable surface may comprise a glass surface; however, a myriad of other materials may be used without limiting the scope of the present invention. In some exemplary embodiments multiple markable surfaces are used, and in some exemplary embodiments as will be discussed below, two markable surfaces may be used to sandwich the substance(s) 103 between them. Generally, the one or more markable surfaces are housed inside the chamber 101*a*, or at least secured therein. Naturally, whatever the material employed, the markable surface is compatible with and hence adapted to receive the one or more substances 103 in a manner consistent with the scope of the present invention.

Substance(s) 103 may be any desirable mark-making substances or composition capable of moving across and leaving marks (i.e., residues of the substance) onto the markable surface so as to form a design onto the markable surface. As mentioned above, substances 103 may include “fluids” such as traditional liquids (for example, and without limiting the scope or the invention, water, oils, or solvents) and flowable particulate materials (such as charcoal powder, graphite powder, or other granular substances) that move and redistribute when the device is manipulated. These mark-making substances work together within the system of the device to create the artistic patterns described herein, including—for example and without limiting the scope of the present invention-by way of selective deposition and adhesion of the mark-making substances onto the markable surfaces; that is, in exemplary embodiments, as fluid media (i.e., a combination of one or more substances 103) moves and redistributes across the markable surfaces during user-manipulation or control of the chamber, the marking substances are carried along flow paths, leaving visible residue on the markable surfaces or creating spanning structures between the closely positioned markable surfaces.

For example, and without limiting the scope of the present invention, substances 103 may be introduced into chamber 101*a* via one or more openings 104*b* (i.e., described in more detail below) so as to position substances 103 onto at least a portion of the one or more markable surfaces 102*a*, 102*b* inside chamber 101*a*. In some embodiments, markable surfaces 102*a*, 102*b* are adapted to hold the substances 103 in between each markable surface; in exemplary embodiments, markable surfaces 102*a*, 102*b* may be mechanically coupled to each other in a manner that allows a user to squeeze them together or otherwise affect the movement of the substances 103 between markable surfaces 102*a*, 102*b* by applying a pressure on the markable surfaces themselves. Additionally, or alternatively, movement of substances 103 within chamber 101*a* may be controlled by movement of chamber 101*a*—for example, tilting, or moving chamber 101*a* horizontally or vertically to cause substances 103 to move across markable surfaces 102*a*, 102*b*.

The exact pattern created by the movement and deposition of the substance(s) 103 onto the markable surfaces is influenced by the specific fluid properties, the surface characteristics of the markable surfaces, the physical forces (e.g. surface tension, gravity, etc) operating on fluids within the chamber 101*a*, and the manipulations performed by the user. This mechanism, coupled with other optional characteristics including but not limited to the controlled spacing between the markable surfaces 102*a*, 102*b*, allows the creation of fine details and intricate structures that would be extremely difficult to achieve through conventional artistic techniques. In some exemplary embodiments, a mechanical relationship between markable surfaces 102*a*, 102*b* would allow a user to change the distance between them, thus influencing the forces within the chamber 101*a* (e.g. screws, springs, or the like associated with the frame of the chamber 101*a*).

At least one opening (104*a* and/or 104*b*) may be employed on a body of chamber 101*a* that is adapted to facilitate application of the one or more substances 103 onto the markable surface 102*a* or 102*b* inside the chamber 101*a*. For example, opening 104*a* may be a pathway on a hollow body that forms chamber 101*a*, which allows substances 103 to be introduced into chamber 101*a* and onto markable surfaces 102*a* and 102*b*. In some exemplary embodiments, multiple sealable openings 104*a* and 104*b* may be employed, such that substances 103 may be applied onto each markable surface inside the chamber and may later be removed for reusing device 100.

In exemplary embodiments, openings 104*a* and/or 104*b* may be simple hinges that hold a frame body of device 100 hinged together, hence allowing a user to open up or close a body of chamber 101*a* in order to access the markable surfaces and deposit the substances within that section of the chamber 101*a*. Other more specific embodiments will be discussed below, but it is understood that the present invention is not limited to the same.

Accordingly, a device 100 for creating artistic designs in accordance with the present invention may comprise: a chamber 101*a* adapted to hold one or more substances 103; at least one markable surface (102*a*, 102*b*) housed inside the chamber 101*a* adapted to receive the one or more substances 103; and at least one opening (104*a*, 104*b*) adapted to facilitate application of the one or more substances 103 onto the markable surface (102*a*, 102*b*) inside the chamber 101*a*, wherein movement of the chamber 101*a* facilitates a flow of the one or more substances 103 to create a design on the markable surface (102*a*, 102*b*).

Turning now to the next figure, FIG. 1B illustrates a flow chart of a method according to exemplary practice of some embodiments of the present invention. More specifically, this view depicts method 1000, which although shown in a series and sequence of steps, may include fewer steps, additional steps, or a different sequence of steps, without deviating from the scope of the present invention.

Method 1000 is an exemplary method for creating artistic designs, comprising the steps of: accessing at least one markable surface housed in a sealable chamber adapted to hold one or more substances (1001); applying the one or more substances inside the chamber through at least one opening of the chamber (1002); sealing the chamber (1003); and moving an orientation of the chamber to facilitate a flow of the one or more substances across the markable surface, wherein the flow of the one or more substances across the markable surface creates a design (1004).

Similarly, FIG. 1C illustrates a flow chart of a method according to exemplary practice of some embodiments of the present invention. More specifically, this view depicts method 2000, which although shown in a series and sequence of steps, may include fewer steps, additional steps, or a different sequence of steps, without deviating from the scope of the present invention. Method 2000 is another exemplary method for creating artistic designs, comprising the steps of: providing a sealable chamber housing at least one markable surface adapted to receive one or more substances, wherein the chamber includes at least one opening adapted to facilitate application of the one or more substances inside the chamber (2001); provide one or more substances adapted to flow onto the at least one or more markable surface (2002); and provide one or more instructions to: apply the one or more substances inside the chamber through at least one opening of the chamber; seal the chamber; and move the chamber to facilitate a flow of the one or more substances across the markable surface to create a design (2003).

Referring now to FIG. 1, there is illustrated a perspective view of a device 100 for the dynamic creation of designs according to an embodiment of the present invention.

In an exemplary embodiment, the device 100 comprises a first plate 102 and a second plate 104 arranged to define an interior region between opposing interior surfaces of the first and the second plates 102, 104. The plates 102, 104 may be surrounded by a gasket assembly including a gasket disposed along a perimeter of the interior region and adapted to establish a spacing that concentrates a surface tension at the edges of a fluid-particle mixture and to facilitate the retention of the fluid-particle mixture within the interior region when the device is in a closed configuration, the fluid-particle mixture comprised of fluid media and marking substances. In some exemplary embodiments, the gasket assembly including a gasket may permit some leakage of the fluid media, marking substances, and/or fluid-particle mixture when the device is in the closed configuration. In some exemplary embodiments, at least one of the plates 102, 104 may be transparent or translucent. In some exemplary embodiments, the device further comprises a transparent or translucent viewing portion through which pattern formation within the interior region is observable when the device is in the closed configuration.

In some exemplary embodiments, the spacing established by the gasket assembly is about 0.25 mm to about 3 mm. In some exemplary embodiments, the spacing may be less than 0.25 mm. In some exemplary embodiments, the spacing may be greater than 3 mm.

In some exemplary embodiments, as illustrated in FIG. 1, an exemplary gasket assembly 108 further includes a frame disposed along the perimeter of the interior region. The frame may be configured to substantially retain fluid media and marking substances within the interior region when the device is in the closed configuration. In some exemplary embodiments, the gasket and frame of an exemplary gasket assembly 108 may be positioned around the perimeter of the interior region to form a fluid-tight seal in the closed configuration.

In some exemplary embodiments, the spacing is adapted to facilitate capillary bridging of the fluid media. The interior region of the device is adapted to hold a volume of air or gas when the device is in the closed configuration.

In some exemplary embodiments, the device 100 comprises a first transparent plate 102 and a second transparent plate 104 connected by a hinge mechanism 106, wherein the plates 102, 104 are surrounded by a gasket and frame assembly 108 that provides structural support and creates a fluid-tight seal when the device is in a closed configuration.

The first and second transparent plates 102, 104 may be constructed from glass, polycarbonate, acrylic, other suitable plastic materials, or other suitable rigid transparent materials that provide appropriate surface properties for the fluid dynamics involved in the design creation process. In preferred embodiments, the plates are rectangular with dimensions ranging from approximately 4 inches by 6 inches (for handheld versions) to approximately 24 inches by 36 inches (for larger studio versions). In some exemplary embodiments, the rectangular plates may have dimensions that are smaller than 4 inches by 6 inches or larger than 24 inches by 36 inches. In some exemplary embodiments, the rectangular plates may have a dimensional ratio that is smaller than or larger than the preferred 4:1 ratio. In some exemplary embodiments, the plates may be implemented in other suitable shapes. For example, and in no way limiting the scope of the present invention, the plates may be square or circular. The thickness of each plate may vary depending on the overall size of the device and desired rigidity. In some exemplary embodiments, the thickness of each plate typically ranges from 1⁄16 inch to 1⁄4 inch. In some exemplary embodiments, the thickness of each plate may be less than 1⁄16 inch. In some exemplary embodiments, the thickness of each plate may be greater than 1⁄4 inch.

In exemplary embodiments where the device includes a hinge mechanism, the hinge mechanism 106 may connect the first transparent plate 102 to the second transparent plate 104 along one edge, allowing the plates to pivot relative to each other in a book-like manner. The hinge mechanism 106 may be constructed from various materials including but not limited to metal, plastic, fabric, or tape materials. In some embodiments, the hinge mechanism 106 comprises a flexible strip of material adhered to both plates, while in other embodiments, it may comprise mechanical hinges with pins or pivots. The hinge mechanism 106 is designed to provide sufficient structural integrity to maintain alignment of the plates while allowing for smooth opening and closing operations. Accordingly, in this exemplary embodiment, actuating hinge mechanism 106 reveals an opening (i.e., akin to openings 104*a* or 104*b*) that facilitates introduction of substances in accordance with the present invention.

In exemplary embodiments, the gasket assembly serves multiple functions: it provides structural support for the device, establishes a spacing between the plates, creates a sealed environment when the device is closed, and at least partially contains the fluids and marking materials within the internal space between the plates. In exemplary embodiments, the gasket assembly may establish a spacing that concentrates a surface tension at the edges of a fluid-particle mixture within the interior region of the device. The gasket portion of the gasket assembly is preferably made from a flexible, fluid-resistant material such as silicone, rubber, or similar elastomers. The gasket may also be made of other suitable material sufficient to establish a spacing and facilitate the retention of a fluid-particle mixture within the interior region of the device.

In some exemplary embodiments, the gasket assembly 108 includes a frame. The frame portion may be constructed from wood, metal, plastic, or composite materials that provide rigidity and protection to the edges of the transparent plates. The frame may be constructed with other suitable materials that offer rigidity and/or substantially retain fluid media and marking substance when the device is in the closed configuration. In some exemplary embodiments, the gasket and frame of the gasket assembly are positioned around the perimeter of the interior region between the plates, creating a fluid-tight seal when the device is closed. The frame may include a mechanism to secure the device in the closed state.

In some embodiments, the "viewing portion" comprises at least a portion of one or both transparent plates. In other embodiments, the viewing portion may comprise a transparent or translucent window integrated into the frame or gasket assembly, provided that the viewing portion permits observation of pattern formation while the device remains in the closed configuration.

Figure 2:
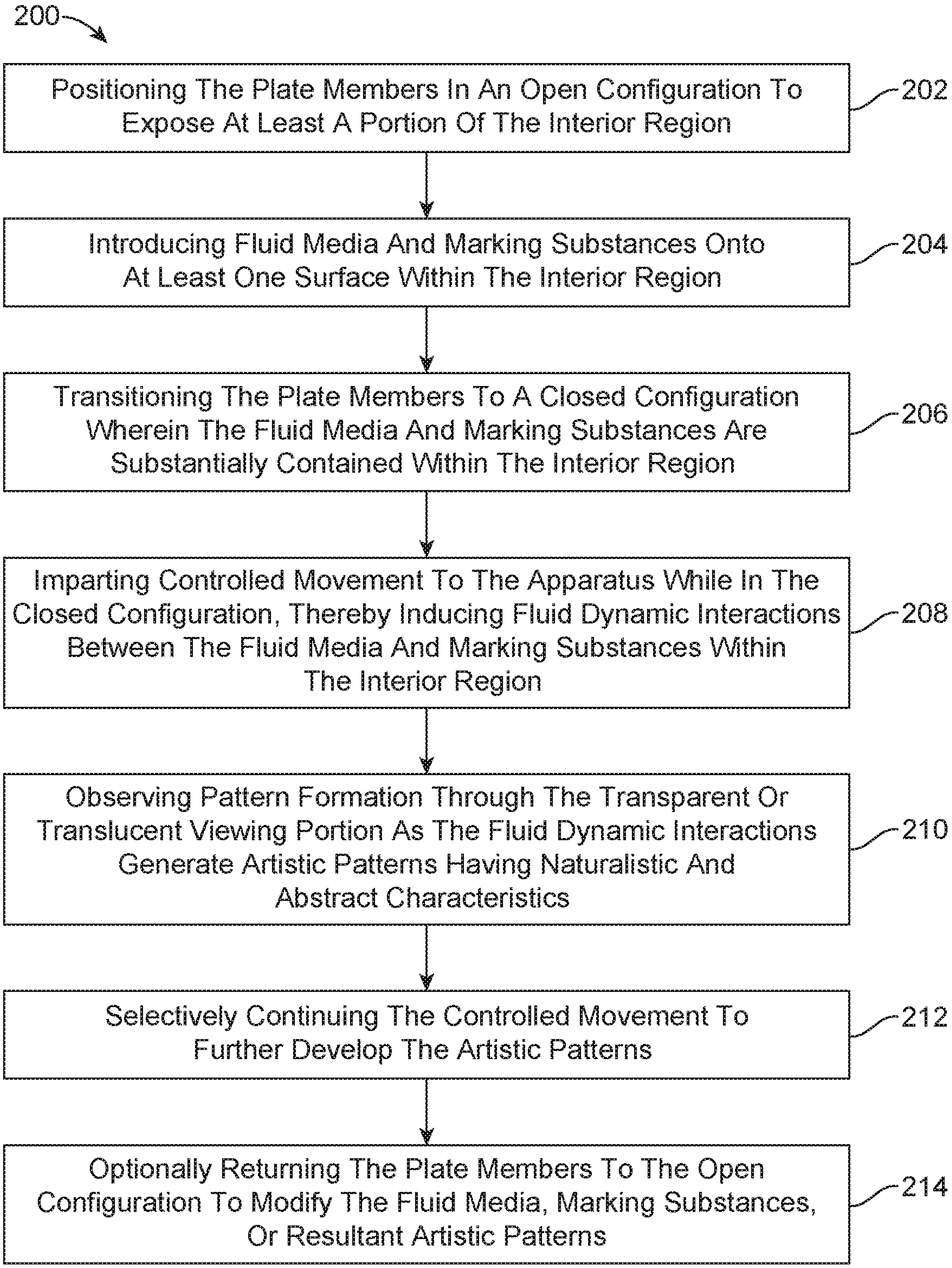
FIG. 2 illustrates a flowchart depicting a method for creating artistic designs, according to an embodiment of the present invention.

Referring now to FIG. 2, there is illustrated a flow diagram depicting a method 200 for creating artistic designs according to an embodiment (e.g. FIG. 1) of the present invention. The method 200 comprises several steps that enable a user to create unique artistic patterns through controlled fluid dynamics within the device described above.

The method 200 begins with step 202, in which the user positions the plate members of the design creation apparatus in an open configuration to expose the interior region. This step provides access to at least one interior surface of the plates.

In step 204, the user introduces fluid media and marking substances onto at least one surface within the interior region. These materials will interact to create the artistic patterns.

In some exemplary embodiments, it may be preferred for the user to introduce a fluid-particle mixture or a powder-fluid suspension onto at least one surface within the interior region when the device is in the open configuration.

In step 206, the user transitions the plate members to a closed configuration wherein the fluid media and marking substances are substantially contained within the interior region. This creates a sealed or semi-sealed environment for the fluid dynamics to operate. In some exemplary embodiments, the fluid media, marking substances, and/or fluid-particle mixture are at least partially retained within the interior region by a gasket assembly, the gasket assembly including a gasket and configured to establish a spacing. In some exemplary embodiments, the fluid media, marking substances, and/or fluid-particle mixture are substantially retained within the interior region by a gasket assembly, wherein the gasket assembly includes a gasket and a frame.

In step 208, the user imparts controlled movement to the apparatus while in the closed configuration, thereby inducing fluid dynamic interactions between the fluid media and marking substances within the interior region.

In step 210, the user observes pattern formation through the transparent or translucent viewing portion as the fluid dynamic interactions generate artistic patterns having naturalistic and abstract characteristics.

In step 212, the user selectively continues the controlled movement to further develop the artistic patterns. Optionally, as shown in step 214, the user may return the plate members to the open configuration to modify the fluid media, marking substances, or resultant artistic patterns.

Referring now to FIG. 3, there is illustrated the first step in an exemplary method for design creation, depicting the positioning of the device in an open configuration, corresponding to step 202 of method 200. In some exemplary embodiments, as shown in FIG. 3, the device is opened at the hinge mechanism 106, separating the first transparent plate 102 from the second transparent plate 104. This open configuration exposes the interior surfaces of both plates, allowing the user to access the interior region defined between the opposing surfaces of the plates.

The device may be positioned on a flat surface with the second plate 104 lying horizontally while the first plate 102 is held upright, or the device may be held at an angle that facilitates the application of materials. Proper positioning in this step ensures controlled application of the fluid media and marking substances in the subsequent step.

Still referring to FIG. 3, the introduction of fluid media and marking substances is depicted, corresponding to step 204 of method 200. In this step, the user places small quantities of solvent (e.g., water, alcohol, mineral spirits, or other suitable carriers) and/or solvents that have been mixed with mark-making substances onto the exposed interior surface of the bottom plate. These fluids are typically applied in small puddles strategically positioned across the surface.

Drawing materials such as inks, pigments, charcoal powder, or other mark-making substances may then be introduced into these solvent puddles or directly onto the plate surface. The specific materials used can vary widely depending on the desired effect. Water-soluble materials such as ink or watercolor pigments may be used with water as the solvent, while oil-based pigments may be used with appropriate oil-compatible solvents. The quantity and placement of these materials influence the resulting design.

The materials may be applied using droppers, brushes, or direct pouring techniques. In some embodiments, the marking substances may be premixed with the solvent before application, while in other embodiments, they may be applied separately to allow for controlled interaction when the device is manipulated. The viscosity, surface tension, and miscibility properties of the selected materials significantly impact the patterns that will form in subsequent steps.

Referring now to FIG. 3, there is illustrated the second step in the method for design creation, depicting the device in a closed configuration, corresponding to step 206 of method 200. As shown in FIG. 3, after the fluid media and marking substances have been applied to the interior surface, the first transparent plate 102 is pivoted about the hinge mechanism 106 until it (or its gasket) comes into contact with the gasket portion of the gasket and frame assembly 108.

When properly closed, the top plate rests on the gasket material and lightly presses on the fluid puddles, creating a thin layer of fluid between the two interior surfaces. The gasket and frame create a seal around the perimeter of the interior region, preventing leakage of the fluid media and marking substances. The closure should be performed gently to avoid excessive pressure that might cause unwanted spreading of the materials or leakage past the gasket.

In this closed configuration, the interior region between the plates forms a confined space where the fluid dynamics will occur. The spacing between the plates is typically very small, ranging from approximately 0.25 mm to 3 mm, which creates ideal conditions for the formation of intricate patterns through surface tension and capillary effects.

In some embodiments, the fluid media is introduced as droplets or small puddles on a first interior surface while the device is open. Upon closing the device, at least some droplets/puddles contact both opposing interior surfaces across the small spacing and become capillary-bridged between the surfaces, at least in part, by surface tension and wetting forces. In this configuration, the moving fluid may form thin channels or globular regions depending on the selected fluid properties, while the edges of the moving fluid region exhibit a meniscus boundary where surface-tension effects are prominent.

In certain preferred embodiments directed to surface-tension-assisted mark deposition, the spacing between opposing interior surfaces is selected such that a moving droplet/channel of the fluid-particle mixture contacts both surfaces while flowing, and such that surface tension is concentrated at the edges of the moving fluid region. By way of example, in some embodiments the spacing is up to about 0.5 mm (including sub-millimeter gaps selected based on fluid viscosity, wetting, and particle characteristics). If the spacing is too large to maintain such capillary bridging for the selected materials, the edge-deposition effect may be reduced and the resulting marks may be less defined.

Referring now to FIG. 3, there is illustrated the third step in the method for design creation, depicting the device being manipulated through controlled movement, corresponding to step 208 of method 200. As shown in FIG. 3, the user holds the device horizontally and gently tilts it in various directions to induce movement of the fluid media and marking substances within the interior region.

The specific movements applied may include gentle tilting from side to side, circular rotations, quick jerking motions, slow & gradual inclinations, and combinations of different movement types.

These movements cause the fluids to flow across the internal surfaces, carrying the marking materials with them. The physical principles governing this process include surface tension, fluid viscosity interactions, capillary action, and other fluid dynamic properties. When different fluids and marking materials interact within the confined space between the plates, they create distinctive patterns based on their physical properties.

In some embodiments, the deposited marking particles form along the meniscus boundary of the moving fluid region, such that the deposited marks constitute edge traces that correspond to prior positions of the meniscus boundary during advancement and/or recession of the moving channels or globular regions.

During such movement, a particle-bearing fluid (e.g., charcoal powder in water) can form flowing channels or globular regions within the confined spacing. In one exemplary implementation, the fluid-particle mixture comprises water as the carrier fluid and charcoal powder as the marking particles, as also illustrated in FIG. 3. In some embodiments, suspended particles become relatively more concentrated near the boundary (edge) of the moving fluid region where surface-tension forces and boundary effects are present and local flow may be slower. As the fluid region advances and/or recedes, a portion of the particles is deposited along these edges onto one or both opposing interior surfaces, thereby forming stationary curved lines that visually trace prior flow paths. Repeated movement in different directions can partially modify earlier deposits and can add new deposits, causing the drawing to accumulate over multiple passes.

The degree and direction of movement directly influence the resulting patterns. The user can adjust the movement based on visual feedback observed through the transparent plates.

Referring now to FIG. 3, there is illustrated the fourth step in the method for design creation, depicting the observation of pattern formation, corresponding to step 210 of method 200. As shown in FIG. 3, the user observes the design created on the plates through the transparent viewing portions.

As the fluid media and marking substances interact and move within the interior region, they create visually distinctive patterns. These patterns may exhibit both naturalistic characteristics (resembling organic forms found in nature, such as tree branches, cellular structures, or flowing water) and abstract elements (non-representational forms with aesthetic appeal).

The artistic patterns develop primarily through the selective deposition and adhesion of marking substances on the interior surfaces of the plates. As fluid media moves and redistributes across these surfaces during manipulation, the marking substances are carried along flow paths, leaving visible residue on the plates or creating spanning structures between the closely positioned plate surfaces. The exact pattern of deposition is influenced by the specific fluid properties, surface characteristics of the plates, and the manipulations performed. This deposition mechanism, coupled with the controlled spacing between the plates, allows the creation of fine details and intricate structures that would be extremely difficult to achieve through conventional artistic techniques.

The transparent nature of at least one of the plates allows real-time observation of the pattern formation process. This visual feedback is crucial as it allows the user to make informed decisions about further manipulation in the subsequent steps. The patterns visible at this stage may be either dynamic (still in motion and developing) or static (having reached a stable configuration).

The specific visual characteristics of the patterns depend on multiple factors, including but not limited to, the chemical properties of the materials used; the viscosity and surface tension of the fluids; the specific gravity differential between different materials; the wetting properties of the fluids relative to the plate surfaces; and the history of movements applied to the device.

Referring now to FIG. 3, there is illustrated the fifth step in the method for design creation, depicting continued manipulation and optional reopening of the device, corresponding to steps 212 and 214 of method 200. As shown in FIG. 3, the user may continue tilting the device to further develop the artistic patterns.

Based on the observed patterns, the user can make aesthetic judgments about whether and how to continue manipulating the device. Additional movements can enhance certain features of the developing design, redirect fluid flows, or create new pattern interactions. The user may choose to continue manipulation until the desired aesthetic effect is achieved.

Additionally, as shown in FIG. 3, the user has the option of returning the plate members to the open configuration. This allows for modification of the fluid media, marking substances, or resultant artistic patterns. When opened, the user can add new materials to specific areas, remove excess fluid, adjust the distribution of existing materials, clean certain areas of the plates, and apply fixing agents to stabilize the design. In some exemplary embodiments, the materials may be fluid media, marking substances, and/or a fluid-particle mixture.

In some implementations, the user may allow deposited marks to dry in place on the interior surfaces to form a stable drawing. If a non-adhesive carrier fluid is used (e.g., water), the device may be opened after completion and the interior surfaces may be wiped or washed clean, thereby enabling the device to be reused for creation of new drawings. In other implementations, a fixing agent or binder may be applied to increase adhesion or permanence of deposited marks.

Alternative marking approaches may also be employed. For example, in an open configuration, a powder may be applied directly to an interior surface and then a fluid may be applied and manipulated (including by rubbing, scraping, or otherwise redistributing the materials) prior to closing the device to create additional flow-driven deposition patterns. In some embodiments, the user may iteratively open the device to add new materials, remove material, or modify localized regions, and then re-close the device to generate new flow paths and additional deposited marks, providing a highly dynamic drawing process capable of producing an effectively unlimited variety of outcomes.

After making any desired modifications, the user may close the device again and continue with further manipulation, essentially returning to step 206 in the method 200. This iterative process can be repeated multiple times until the user is satisfied with the final design.

Upon completion of a satisfactory design, the device demonstrates significant reusability characteristics. The transparent nature of the plates allows documentation of the created design through photography when placed on various backgrounds including light tables, white surfaces, colored surfaces, or patterned backgrounds. The transparent design can also serve as a temporary collage element in composite photographic works. Following documentation, the device can be opened, thoroughly cleaned of all design materials using appropriate solvents or cleaning agents, and prepared for the creation of entirely new designs. This reusability feature provides substantial economic and creative advantages to users who can repeatedly utilize the same apparatus for multiple artistic creations.

In some embodiments, drawings created using fine powders (e.g., charcoal powder) exhibit high intricacy and fine detail suitable for high-resolution imaging. High-resolution images of such drawings may be captured and digitally enlarged to reveal additional micro-structures and patterning, enabling creation of prints or derivative works in a variety of formats. The enlarged images may be used to generate prints (including large-format prints) and other derivative artistic outputs across a variety of physical and digital media.

Figure 4:
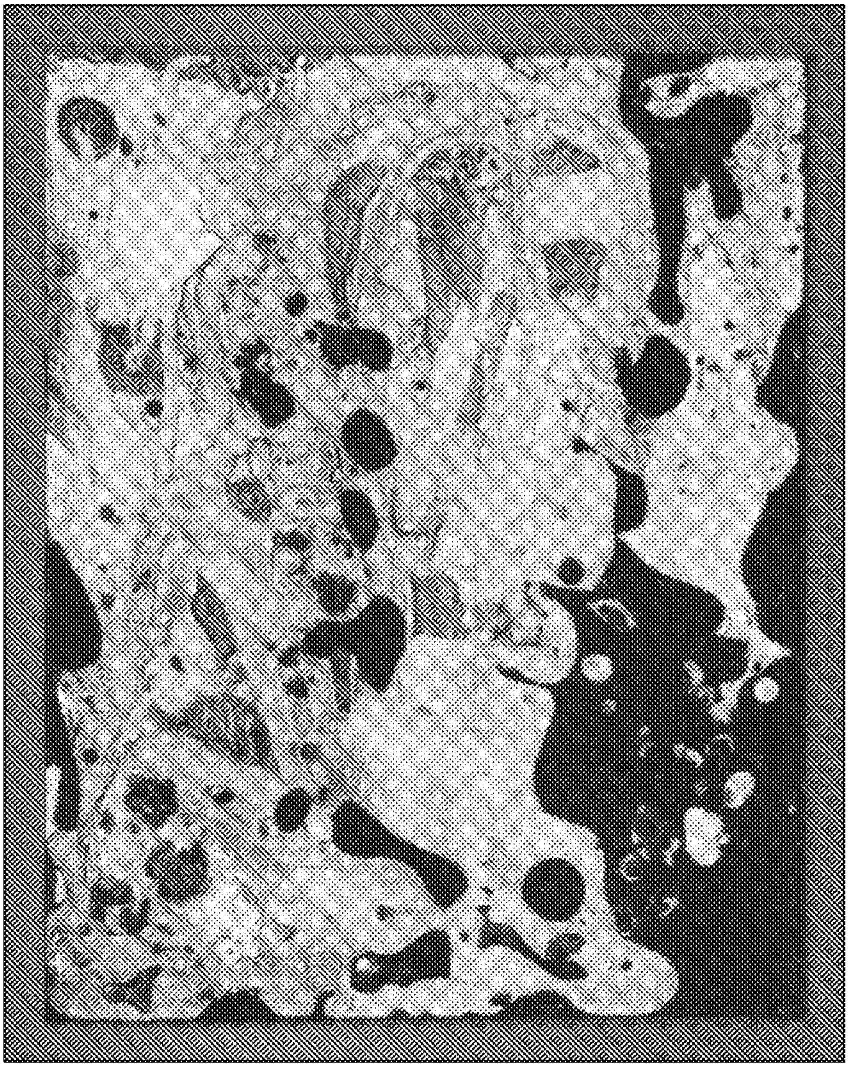
FIG. 4 illustrates a first representative example of a design created utilizing the device and method, according to an embodiment of the present invention.
Figure 5:
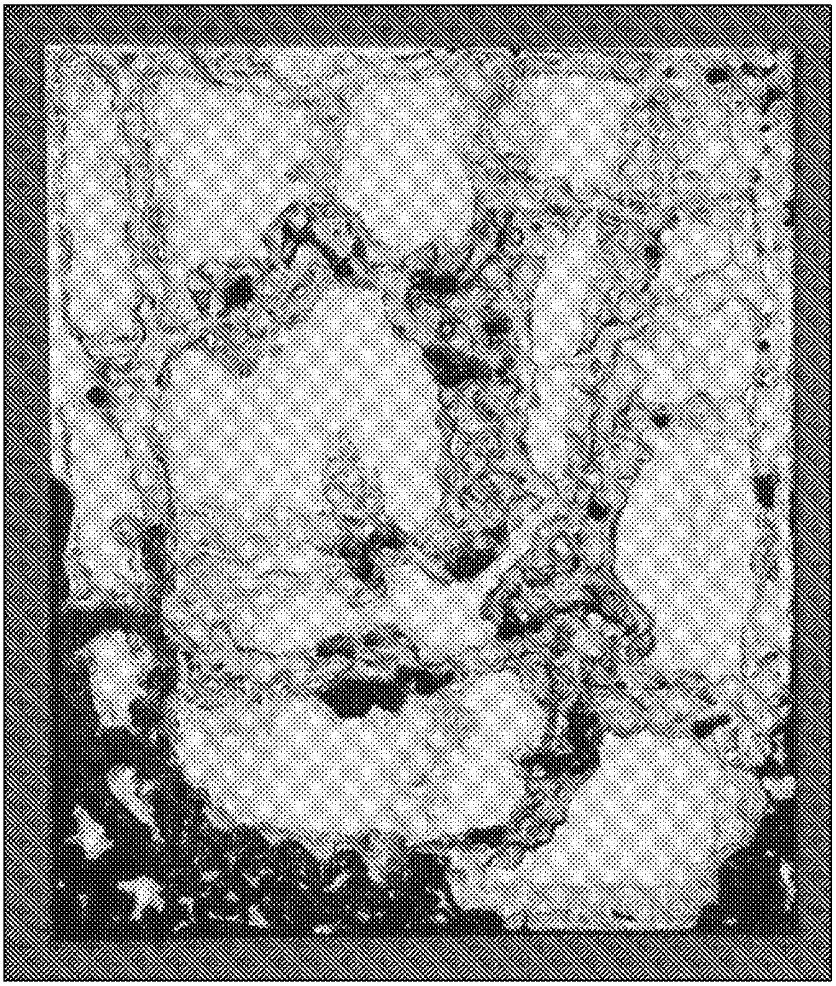
FIG. 5 illustrates a second representative example of a design created utilizing the device and method, according to an embodiment of the present invention.
Figure 6:
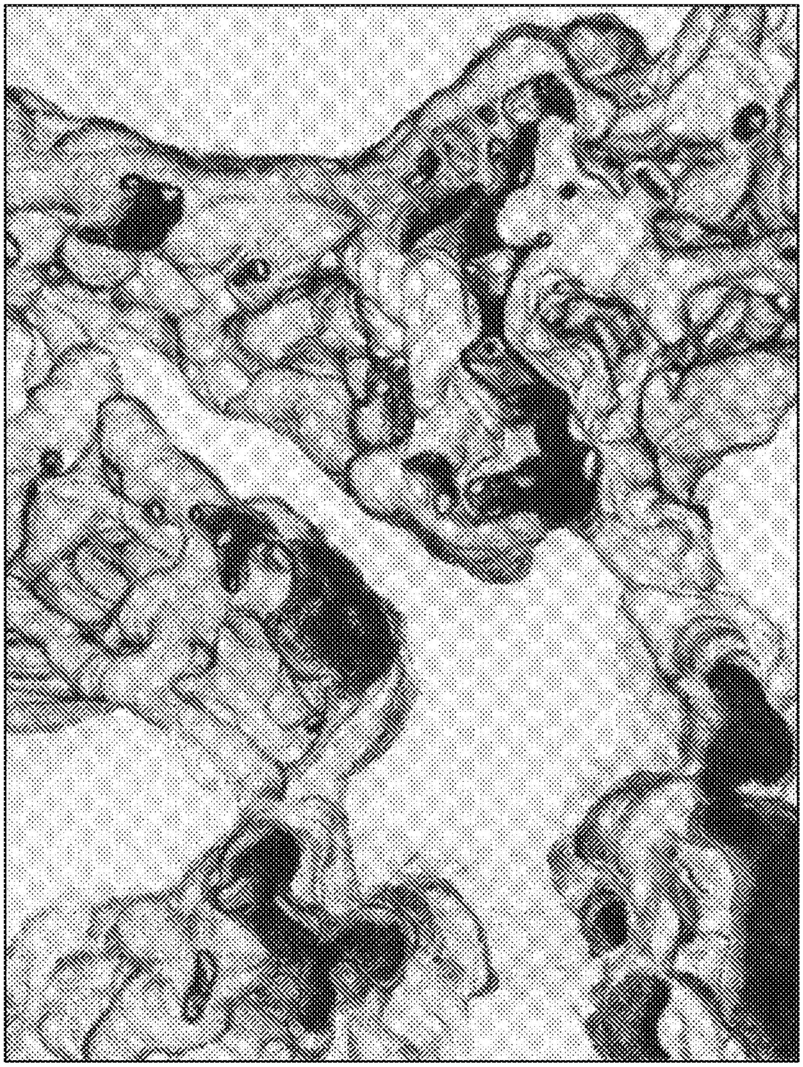
FIG. 6 illustrates a detailed view of a design created utilizing the device and method, according to an embodiment of the present invention.

FIGS. 4, 5, and 6 illustrate representative examples of designs created utilizing the device and method of the present invention. These examples demonstrate the wide range of visual effects that can be achieved through the controlled fluid dynamic interactions.

FIG. 4 shows a design 400 characterized by large light and dark areas, with splatter-like patterns and flowing forms. This type of design can result from freshly applying concentrated mark-making fluid after allowing more dilute fluid to disperse on wetted plate areas.

FIG. 5 demonstrates a design 500 with cellular or web-like structures, showing how surface tension can create intricate networks of interconnected lines. This effect can be achieved using concentrated mark-making fluid (such as charcoal powder in water) alone; early movements set up random channels formed by marking material left behind as fluid moves between the plates, and subsequent movement of fluid through and around these channels adds additional marks therein, creating natural complex separation patterns.

FIG. 6 provides a detailed view of a design 600, highlighting the intricate textures and transitions that can form at the micro level. The complex interactions between different fluids and granular material create detailed boundary regions with rich visual interest.

Each of these examples illustrate how the physical principles of fluid dynamics, when harnessed within the controlled environment of the device, can produce artistic results that would be difficult to achieve through traditional artistic techniques.

In accordance with some implementations of the present invention, the choice of materials influences the resulting designs. The device components themselves may be constructed from various materials. In one embodiment, the transparent plates may be made from glass (provides optimal clarity and resistance to scratching), acrylic (lighter weight, more impact-resistant), polycarbonate (highly durable), and/or other transparent or translucent materials with suitable surface properties In one embodiment, the fluid media may include water, alcohol (isopropyl, ethanol), mineral spirits, specialized art mediums, oils, and combinations of compatible fluids.

In one embodiment, the marking substances may include inks (water-based, alcohol-based, or oil-based), pigments (dry or in suspension), charcoal powder, graphite powder, metallic powders, oil paints, watercolors, and special effect additives (such as mica powders or iridescent materials).

The interaction between the selected materials and the surface properties of the plates influences the behaviour of the fluids during manipulation. For example, and in no way limiting the scope of the present invention, hydrophobic plate surfaces may cause water-based materials to bead and create distinctive patterns, while hydrophilic surfaces may encourage more even spreading. In some exemplary embodiments, at least one of the opposing interior surfaces may have surface properties selected from hydrophobic or hydrophilic characteristics. In some exemplary embodiments, at least one of the opposing interior surfaces may be selected based on other surface properties that influence spreading or beading behavior of at least one component of the fluid media on at least one of the opposing interior surfaces.

In an alternative embodiment of the present invention, the device is configured as a permanently sealed unit with one or more access openings. These openings, equipped with secure closures such as plugs, stoppers, or threaded caps, allow selective access to the interior region. Such a configuration enables users to introduce new fluid media and marking substances, clean or alter existing designs, and reconfigure materials within the sealed environment. Specialized cleaning tools proportioned to operate through these access openings may be included with this embodiment to facilitate maintenance and preparation for new design creation.

In further embodiments, the device may incorporate non-planar geometries wherein the first and second members comprise curved or irregular surfaces. Such configurations may include, but are not limited to, cylindrical tubes, spherical chambers, ellipsoidal forms, undulating surfaces, or other three-dimensional geometric arrangements. These alternative geometries enable the creation of distinctive patterns through the interaction of fluid media and marking substances across curved internal surfaces, producing artistic effects not achievable with planar configurations while still employing the same fundamental fluid dynamic principles.

Although the features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for creating an artistic drawing, comprising:
- a first plate and a second plate arranged to define an interior region between opposing interior surfaces of the first and second plates;
- a gasket assembly including a gasket disposed along a perimeter of the interior region adapted to establish a spacing that concentrates a surface tension at the edges of a fluid-particle mixture and to facilitate the retention of the fluid-particle mixture within the interior region when the device is in a closed configuration, the fluid-particle mixture comprised of fluid media and marking substances; and
- a transparent or translucent viewing portion through which pattern formation within the interior region is observable when the device is in the closed configuration;
- wherein, in the closed configuration, user-controlled movement of the device causes fluid dynamic interactions between the fluid media and the marking substances such that the fluid-particle mixture flows between the opposing interior surfaces and leaves deposited marking particles on at least one opposing interior surface to form the artistic drawing observable through the viewing portion.

2. The device of claim 1, wherein the gasket assembly further includes a frame disposed along the perimeter of the interior region, the frame configured to substantially retain the fluid media and the marking substances within the interior region when the device is in the closed configuration.

3. The device of claim 2, wherein the gasket and the frame are positioned around the perimeter of the interior region to form a fluid-tight seal in the closed configuration.

4. The device of claim 2, further comprising a hinge mechanism coupling the first plate to the second plate and permitting movement between an open configuration providing access to the interior region and the closed configuration.

5. The device of claim 1, wherein the spacing enables at least a portion of the fluid-particle mixture to contact both the opposing interior surfaces during flow.

6. The device of claim 1, wherein the spacing and materials for the fluid media and the marking substances are selected such that meniscus boundaries of moving channels or globules of the fluid particle mixture promote concentration of the marking particles near edges of the moving channels or globules and deposition of the marking particles along the edges.

7. The device of claim 1, wherein the spacing is adapted to facilitate capillary bridging of the fluid media.

8. The device of claim 1, wherein the spacing is about 0.25 mm to about 3 mm.

9. The device of claim 1, wherein the device is configured to permit transitioning from the closed configuration back to the open configuration to enable at least one of: adding new materials, removing materials, modifying deposited marks, or cleaning at least one interior surface, and subsequently returning to the closed configuration for continued development of the artistic drawing.

10. The device of claim 1, further comprising at least one access opening provided with a closure, the at least one access opening enabling introduction and/or removal of at least one of the fluid media or the marking substances to facilitate maintenance, cleaning, or reconfiguration of materials.

11. The device of claim 1, wherein at least one opposing interior surface has surface properties selected from hydrophobic or hydrophilic characteristics to influence spreading or beading behaviour of at least one component of the fluid media on the at least one opposing interior surface.

12. The device of claim 1, wherein the marking substances comprise at least one of charcoal powder, graphite powder, pigments, metallic powders, or mica powders.

13. A method for creating an artistic drawing using a device comprising a first plate and a second plate defining an interior region therebetween, the method comprising:
- (a) positioning the device in an open configuration to expose the interior region;
- (b) introducing fluid media and marking substances onto an interior surface within the interior region;
- (c) transitioning the device to a closed configuration in which the fluid media and the marking substances are at least partially retained within the interior region by a gasket assembly, the gasket assembly configured to establish a spacing;
- (d) imparting controlled movement to the device in the closed configuration to cause a fluid-particle mixture formed by the fluid media and the marking substances to flow between opposing interior surfaces; and
- (e) forming deposited marking particles on at least one interior surface as edge traces of moving channels or globules of the fluid-particle mixture, thereby producing the artistic drawing observable through a transparent or translucent viewing portion in the closed configuration.

14. The method of claim 13, wherein the controlled movement comprises at least one of tilting from side to side, circular rotations, quick jerking motions, or slow and gradual inclinations.

15. The method of claim 13, wherein transitioning to the closed configuration establishes the spacing, the spacing selected such that at least a portion of the fluid-particle mixture contacts both the opposing interior surfaces during flow.

16. The method of claim 13, wherein the deposited marking particles form preferentially along meniscus boundaries of the moving channels or globules.

17. The method of claim 13, wherein introducing comprises applying a powder marking substance onto the interior surface before applying a carrier fluid, and manipulating the powder marking substance and the carrier fluid in the open configuration before transitioning to the closed configuration.

18. The method of claim 13, wherein the fluid media comprises at least one of water, alcohol, mineral spirits, oil, or an art medium.

19. The method of claim 13, further comprising reopening the device after step (d) to modify at least one of the fluid media, the marking substances, or deposits, and reclosing the device and repeating step (d) to further develop the artistic drawing.

20. The method of claim 13, further comprising:

(f) capturing a high-resolution digital image of the artistic drawing through the transparent or translucent viewing portion while the device is in the closed configuration; and (g) digitally enlarging the image to reveal micro-structures and fine details suitable for creating large-format prints or derivative artistic outputs.

* * * * *